(12) United States Patent
Khan et al.

(10) Patent No.: US 8,174,983 B2
(45) Date of Patent: May 8, 2012

(54) METHOD AND APPARATUS FOR FLEXIBLE APPLICATION-AWARE MONITORING IN HIGH BANDWIDTH NETWORKS

(75) Inventors: Afaq Khan, Santa Clara, CA (US); Catherine McLachlan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 12/380,371

(22) Filed: Feb. 25, 2009

(65) Prior Publication Data

US 2010/0214926 A1    Aug. 26, 2010

(51) Int. Cl.
H04L 1/00 (2006.01)
(52) U.S. Cl. .................. 370/235; 370/252; 370/542
(58) Field of Classification Search .......... 370/229–235, 370/252, 253, 542–544; 726/11, 13
See application file for complete search history.

(56) References Cited

U.S. PATENT DOCUMENTS

| | | | |
|---|---|---|---|
| 6,681,232 B1 | 1/2004 | Sistanizadeh et al. | |
| 6,768,716 B1 * | 7/2004 | Abel et al. | 370/230 |
| 6,920,112 B1 | 7/2005 | McCloghrie et al. | |
| 7,269,157 B2 | 9/2007 | Klinker et al. | |
| 7,774,461 B2 * | 8/2010 | Tanaka et al. | 709/224 |
| 2003/0225549 A1 | 12/2003 | Shay et al. | |
| 2003/0235171 A1 * | 12/2003 | Lundstrom et al. | 370/338 |
| 2006/0271823 A1 * | 11/2006 | Smith | 714/37 |
| 2007/0189288 A1 | 8/2007 | Andrews et al. | |
| 2009/0252494 A1 * | 10/2009 | Capurso et al. | 398/58 |

OTHER PUBLICATIONS http://www.cisco.com/en/US/products/ps6616/products_white_paper09186a0080110040.shtml, 2009.
http://www.cisco.com/en/US/docs/ios/12_4t/12_4t4/ht_fpm.html, 2009.
http://www.cisco.com/en/US/prod/collateral/iosswrel/ps6537/ps6586/ps6723/prodwhite_paper0900aecd803936f6.html, 2009.
http://www.cisco.com/en/US/docs/ios/12_4t/qos/configuration/guide/qsnbarl.html, 2009.
RFC 2613 standard, R. Waterman, et al., "Remote Network Monitoring Management Information Base Extensions for Switched Networks", Jun. 1999.
RFC 3577 standard S. Waldbusser, et al., "Introduction to the Remote Monitoring (RMON) Family of Management Information Base Modules", Aug. 2003.
RFC 4502 standard, S. Waldbusser, "Remote Network Monitoring Management Information Base version 2", May 2006.

* cited by examiner

Primary Examiner — Pao Sinkantarakorn
(74) Attorney, Agent, or Firm — Baker Botts L.L.P.

(57) ABSTRACT

There is provided apparatus including at least one pre-capture filter, operative to receive at least some of a plurality of packets transmitted in a network, and to identify an application type of each of the received packets and a plurality of application-type specific post capture filters, each associated with at least one of a plurality of application-type specific monitoring stations, the plurality of application-type specific post capture filters being operative to receive from the at least one pre-capture filter packets of a specific application type and to transmit the packets of the specific application type to the at least one of the plurality of application type specific monitoring stations associated therewith.

12 Claims, 4 Drawing Sheets

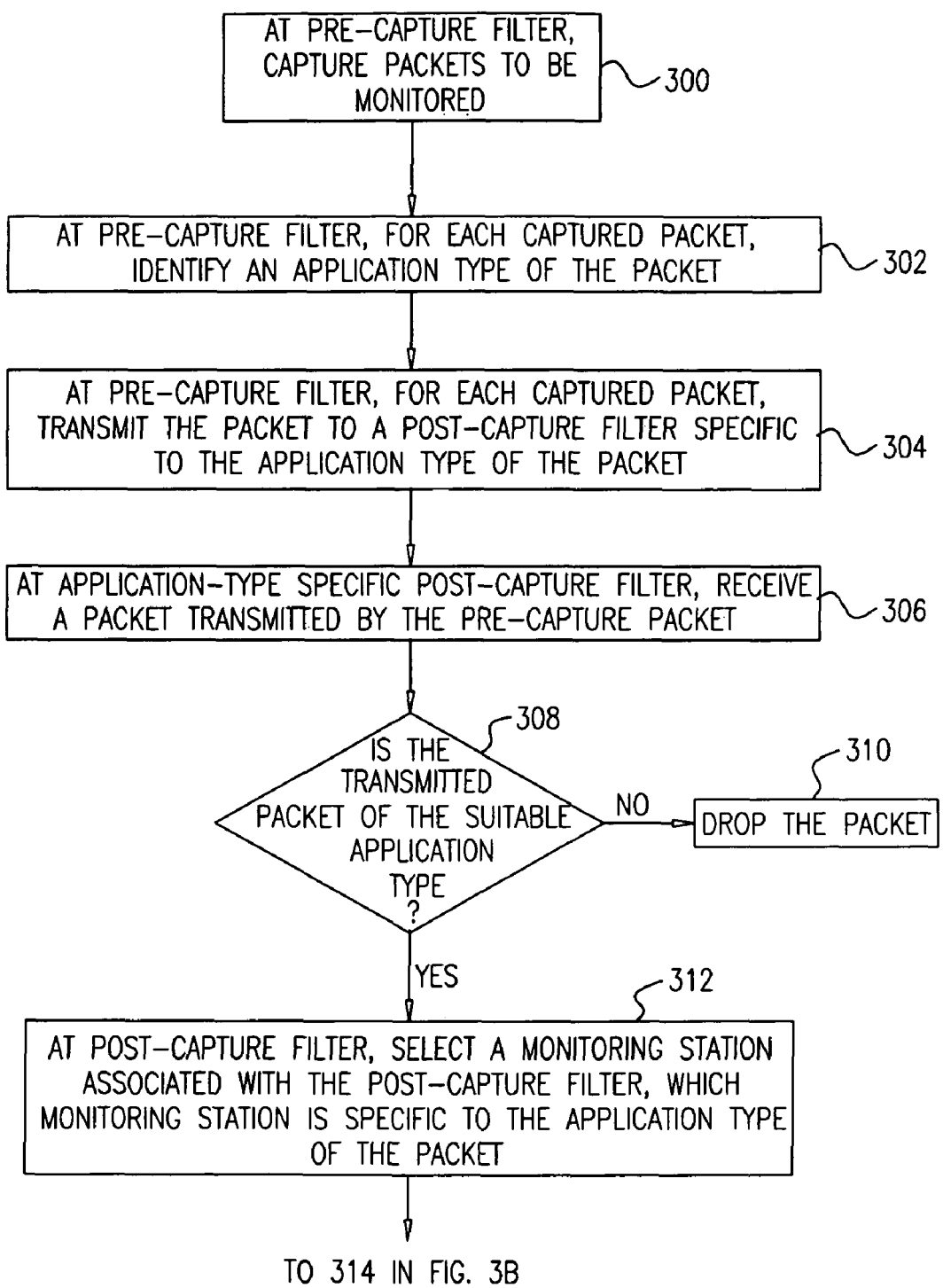

US 8,174,983 B2

METHOD AND APPARATUS FOR FLEXIBLE APPLICATION-AWARE MONITORING IN HIGH BANDWIDTH NETWORKS

FIELD OF THE INVENTION

The present invention relates generally to communication systems, and particularly to methods and systems for providing application-aware packet monitoring in high bandwidth networks.

BACKGROUND OF THE INVENTION

Many recent networking trends, such as Internet Protocol Television (IPTV), Voice Over Internet. Protocol (VOIP), provide complex services to users, thereby increasing the bandwidth demands on a network, and subsequently causing increasing use of 10 Gb Ethernet links in servers and data centers.

In many networks, data packets are monitored, such as for compliances troubleshooting, performance tuning and enforcing network security. Current packet monitoring tools are server based, and are generally not able to keep up with the increasing packet rates.

Current packet monitoring tools are described, for example, in the RFC 3577 standard entitled "Introduction to the Remote Monitoring (RMON) Family of Management Information Base Modules", in the RFC 4502 standard, entitled. "Remote Network Monitoring Management Information Base version 2", and in the RFC 2613 standard entitled "Remote Network Monitoring Management Information Base Extensions for Switched Networks", which are incorporated herein by reference.

Due to the increasingly large packet rates, current packet monitoring tools usually employ some reduced monitoring policy, such as monitoring a sample of the packets or filtering the packets in a static fashion. One example of a monitoring policy, which is based on sampling of packets, is described in Applicant's U.S. Pat. No. 6,920,112, filed on Jun. 29, 1998 and entitled "SAMPLING PACKETS FOR NETWORK MONITORING", which is hereby incorporated by reference.

Additionally, current packet capturing tools may not enable direction of packet traffic to different monitoring devices or packet sniffers, and specifically not in an application-aware manner, particularly in networks having dynamic topologies.

U.S. Patent Application Publication Number 2003/0225549, filed on Mar. 31, 2003 and entitled "SYSTEMS AND METHODS FOR END-TO-END QUALITY OF SERVICE MEASUREMENTS IN A DISTRIBUTED NETWORK ENVIRONMENT", which is hereby incorporated by reference, describes monitoring stations which are configured to provide information on all seven layers in the OSI network model, for the purpose of measuring and increasing quality-of-service in a network.

Applicant's U.S. Patent Application Publication No. 2007/0189288, filed on Feb. 13, 2006 and entitled "METHOD AND SYSTEM FOR PROVIDING CONFIGURATION OF NETWORK ELEMENTS THROUGH HIERARCHICAL INHERITANCE", which is hereby incorporated by reference, describes a system and a method for monitoring packets based on a logical group of devices from which they were sent.

U.S. Pat. No. 6,681,232, filed on May 22, 2001 and entitled "OPERATIONS AND PROVISIONING SYSTEMS FOR SERVICE LEVEL MANAGEMENT IN AN EXTENDED-AREA DATA COMMUNICATIONS NETWORK", which is hereby incorporated by, reference, describes an application aware data analyzer which acts as an intelligent sniffer for all traffic passing through a specific link in a network.

The present invention will be more fully understood from the following detailed description of embodiments thereof, taken together with the drawings in which:

BRIEF DESCRIPTION OF THE DRAWINGS

FIGS. 3A and 3B, when taken together, are a simplified flowchart that schematically illustrates a method for monitoring data in accordance with an embodiment of the present invention.

DESCRIPTION OF AN EXAMPLE EMBODIMENT

Overview

Embodiments of the present invention provide improved methods and systems for monitoring data packets in high bandwidth networks, in an application-aware manner.

The system of the present invention operates in a communications network interconnecting multiple computers, which computers transmit a plurality of data packets, each of a specific application type, over the network.

In some embodiments, the system includes a first filter, which is termed a pre-capture filter, which receives at least part of the data packets transmitted in a network, identifies a specific application type for the received packets, and sends the packets further downstream in the network to different locations based on the application type of each packet. In these embodiments the system further includes a plurality of application type specific second filters, which are termed post-capture filters, which receive from the pre-capture filter packets of a specific application type, and transmit packets of this application type to one or more application type specific monitoring stations associated with each of the post-capture filters. The application type specific monitoring stations then monitor the packets received from the post-capture filter.

In other embodiments, the system includes at least one filter, which is associated with monitoring stations, which monitoring stations are adapted to monitor packets received thereby. The filter receives some packets transmitted over the network, and transmits these packets to the monitoring stations. Upon receipt of an overload or back-pressure indication from one of the monitoring stations, the filter balances the load of packets transmitted to that monitoring station.

The methods and systems described herein can be used in various data monitoring devices, such as Cisco 6500 Router, Cisco 7600 Router, Nexus and ASR1000, all of which are commercially available from Cisco. Additionally, the methods and systems described herein may be used with any Deep Packet Inspection (DPI) system which supports a variation of a Switched Port Analyzer (SPAN), such as Remote SPAN (RSPAN) and Encapsulated Remote SPAN (ERSPAN).

System and Method Description

Figure 1:
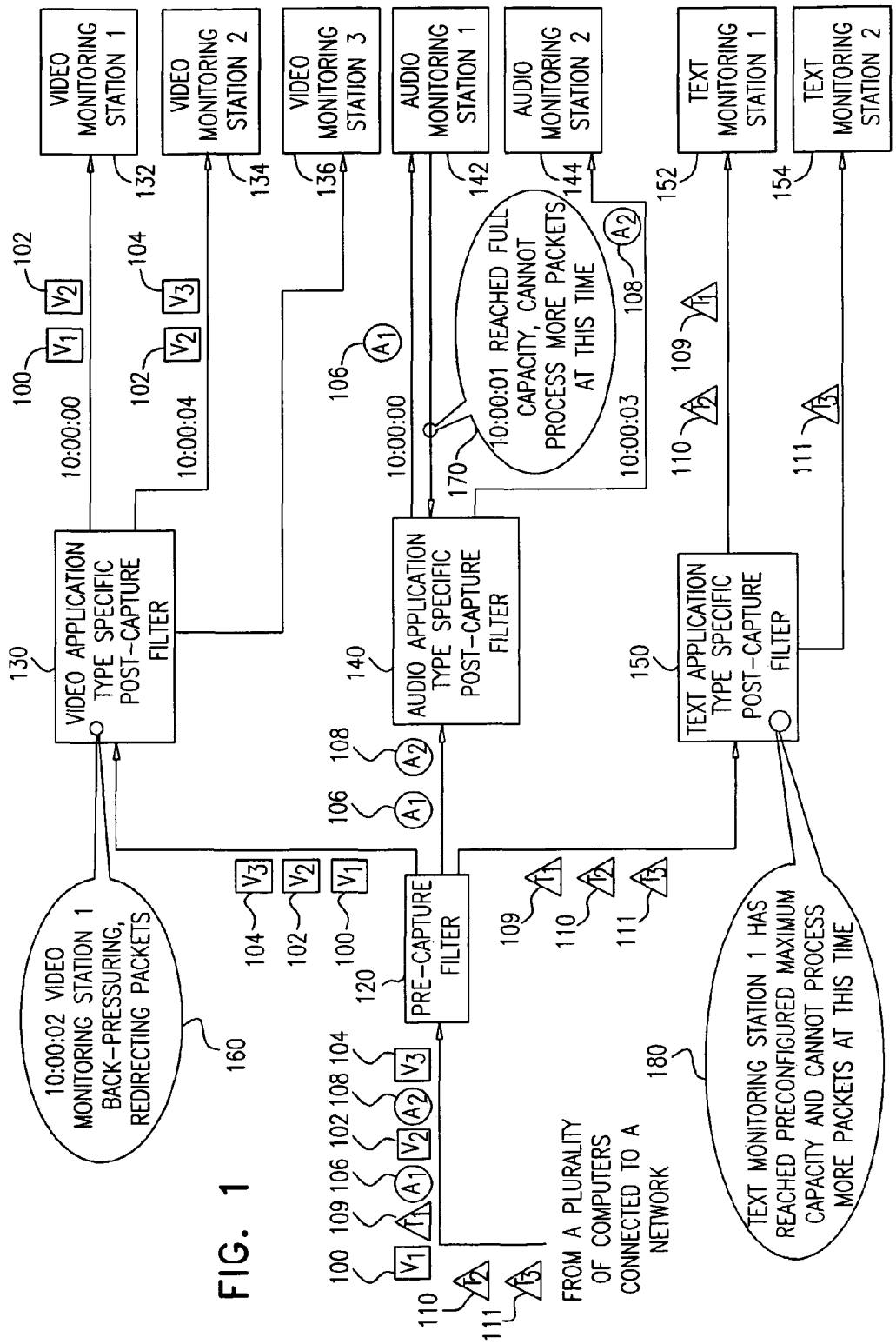
FIG. 1 is a simplified block diagram illustration of a data monitoring system constructed and operative in accordance with an embodiment of the present invention.

Reference is now made to FIG. 1, which is a simplified block diagram illustration of a data monitoring system constructed and operative in accordance with an embodiment of the present invention.

As seen in FIG. 1, a plurality of data packets, each of a specific application type, are transmitted over a network. In the illustrated embodiment, the plurality of data packets includes three packets of a video application type, indicated by reference numerals 100, 102 and 104, two packets of an audio application type, indicated by reference numerals 106 and 108, and three packet of a text application type, indicated by reference numeral 109, 110 and 111.

The packets 100, 102, 104, 106, 108, 109, 110 and 111 are received by a pre-capture filter 120, which pre-capture filter then identifies the application type of each packet, and transmits the packets further downstream in the network based on each packet's application type. The pre-capture filter 120 typically includes Flexible Packet Matching (FPM) rules and/or Network Based Application Recognition (NBAR) rules, which are used to identify the application type of a received packet. Thus, the pre-capture filter 120 functions as an application-aware filter.

Preferably, the pre-capture filter 120 functions as a demultiplexer, by receiving packets on a single input line and transmitting each of the packet to one multiple application type specific post capture filters, based on an application type associated with the packet, as described in further detail hereinbelow.

As seen in the illustrated embodiment, pre-capture filter 120 transmits packets 100, 102 and 104, which are identified thereby as being of a video application type, to a video application type specific post-capture filter 130. The video application type specific post-capture filter 130 then transmits the packets received thereby to one or more video application-type specific monitoring stations associated therewith, shown in the illustrated embodiment as three video application-type specific monitoring stations 132, 134.and 136.

In a similar manner, pre-capture filter 120 transmits packets 106 and 108, which are identified thereby as being of an audio application type, to an audio application type specific post-capture filter 140. Audio application type specific post-filter 140 then transmits the packets received thereby to one or more audio application-type specific monitoring stations associated therewith, shown in the illustrated embodiment as two audio application-type specific monitoring stations 142 and 144.

Pre-capture filter 120 also transmits packets 109, 110 and 111 which are identified thereby as being of a text application type, to a text application type specific post-capture filter 150. Text application type specific post-capture filter 150 then transmits the packets received thereby to one or more text application-type specific monitoring stations associated therewith, shown in the illustrated embodiment as two text application-type specific monitoring stations 152 and 154.

Preferably, the post-capture filters 130, 140 and 150, balance the packet load directed to the monitoring stations associated therewith, and/or limit the rate of packets transmitted to these monitoring stations, thereby providing an interface between the large bandwidth ports from which packets are received, which ports are typically 10-100 Gb ports, and the monitoring stations which typically have a capacity of 1 Gb.

In the illustrated embodiment, video application type specific post-capture filter 130 transmits packets 100 and 102 to video application type specific monitoring station 132 for monitoring. Subsequently, video application type specific post-capture filter 130 notices that video application type specific monitoring station 132 is back pressuring, as indicated by reference numeral 160, and balances the load on monitoring station 132 by redirecting packets received thereby to other video application type specific monitoring, stations. In the illustrated embodiment, video application type specific post-capture filter 130 retransmits packet 102 to video application type specific monitoring station 134, and continues to transmit packet 104 to the same monitoring station.

The video application type specific post capture filter 130 may notice that the video application type specific monitoring station 132 is back pressuring by receiving packets which are returned from the monitoring station 132 without being processed, or by receiving a false collision detection signal from the monitoring station 132.

Audio application type specific post-capture filter 140 transmits packet 106 to audio application type specific monitoring station 142. Subsequently, audio application type specific monitoring station 142 transmits a message to audio application type specific post-capture filter 140 indicating that the monitoring station. 142 has reached full capacity, and cannot process any more packets at the given time, as seen at reference numeral 170. The audio application type specific post-capture filter 140 then balances the load on monitoring station 142 by transmitting packet 108 to a different audio application type specific monitoring station, which, in the illustrated embodiment, is monitoring station 144.

Preferably, a post-capture filter may also limit the rate of packets transmitted to a given monitoring station, without receiving any type of overload indication from the monitoring station. The post-capture filter may be preconfigured, such as by a system administrator, to predefine a maximum capacity value for the given monitoring station. This value is typically measured in packets per second or in bits per second.

As seen in the illustrated embodiment, the text application-type specific post-capture filter 150 is preconfigured such that the maximum capacity value of text application-type specific monitoring stations 152 and 154 is predefined to be 100 packets per second.

The text application-type specific post-capture filter 150 transmits packets 109 and 110 to text application-type specific monitoring station 152 for monitoring, while keeping track of the number of packets transmitted to monitoring station 152 in this second. Subsequently, text application-type specific post-capture filter 150 notices that packet 110 was the one-hundredth packet transmitted to monitoring station 152 this second, as indicated at reference numeral 180. Therefore, post-capture filter 150 limits the rate of packets-transmitted to monitoring station 152 by transmitting packet 111 to text application-type specific monitoring station 154.

As mentioned above, the pre-capture filter 120 typically includes Flexible Packet Matching (FPM) rules or Network. Based Application Recognition (NBAR) rules, which cause it to function as an application-aware filter.

NBAR and FPM rules are known in the art, and are used for classifying packets. For example, an nBAR for classifying all 'Real-Time Transport Protocol' packets may be defined by defining a protocol to be matched when processing the packets, such as by using the statement: 'match protocol rtp' in the class-map field of the nBAR rule. This would effectively send all voice payload packets in the given class to those post-capture filters or monitoring stations that are pre-configured for that class. An equivalent FPM rule may be defined in a similar manner, following some syntactical changes.

In the context of this invention, NBAR rules may be used a similar manner to that described in the 'nBAR RTP Payload Classification' white paper, published by Cisco, the contents of which are hereby incorporated by reference, and which may be found, inter-alia, at:
http://www.cisco.com/en/US/products/ps6616/
   products_white_paper09186a008011004 0.shtml.

For nBAR rules, existing command line interfaces may be used for defining the application criteria and for dealing with overlap of classification statements in the nBAR rules.

In the context of this invention, FPM rules may be used in a similar manner to that described in the 'Flexible Packet Matching' and the 'Flexible Packet Matching Deployment Guide' white papers, both published by Cisco, the contents of which are hereby incorporated by reference, and which may be found, inter-alia, at:
http://www.cisco.com/en/US/docs/ios/12_4t/12_4t4/ht_fpm.html; and
http://www.cisco.com/en/US/prod/collateral/iosswrel/ps6537/ps6586/ps6723/prod_white_paper0900aecd803936f6.html.

For FPM rules, existing Modular Quality of Service Command Line Interface (MQC) are used, using statements of the type 'class-map type stack', such that the first protocol matching statement will be matched first, thereby dealing with overlapping classification statements in the FPM rules.

It is appreciated that filtering based on NBAR and/or FPM is practical in recently manufactured and advance routers and switches, such as for example, routers of the ASR1000 series and switches such as Catalyst 6500 with PISA daughter board, both of which are available from Cisco. For example, when using NBAR and/or FPM rules, an ASR1000 router and a Cat6K/PISA switch may be scaled up to 4-8 Gb, instead of a much lower typical capacity, which is usually available with devices that carry out deep inspection using general purpose CPU.

In the pre-capture filter, NBAR rules may be used, for example, for capturing all audio packets, such as by using a 'match protocol rtp' statement, thereby providing an efficient way for capturing and recording audio traffic for later use, such as for later playback.

As another example, an NBAR rule may be used for capturing selected HTTP traffic, such as based on a string or characteristic located in the HTTP header or data, such as by using a 'match http' statement. One advantage of this type of rule is the ability to log all traffic destined to a specific website, which would be particularly useful for the website manager, web analyst or supervisor.

In yet a further, and extremely useful example, an NBAR rule may be used to capture all peer-to-peer application traffic, such as traffic generated by bitTorrent, Kazaa, eMule and other similar file sharing programs. In a similar manner, one could use an NBAR rule for capturing all Instant Messaging traffic, such as that generated by ICQ, MSN and AOL instant messaging programs. This would enable the logging and analyzing of all the types of peer-to-peer and/or instant messaging traffic and noticing all the people involved in such traffic, as well as other important characteristics of peer to peer and instant messaging traffic. This would also enable sending all peer-to-peer or instant messaging traffic to audit or monitoring stations, in order to make sure that the traffic meets Regulatory Compliance.

As an additional example, an NBAR rule may be used for capturing all real-time streaming media traffic or multi-media traffic, such as traffic transmitted using the Real-Time Streaming Protocol (RTSP).

Additional examples, as well as further information relating to the benefits and functionalities of NBAR rules, may be found in 'Classifying Network Traffic using NBAR' published by Cisco, the contents of which are hereby incorporated by reference and which can be found at:
http://www.cisco.com/en/US/docs/ios/12_4t/qos/configuration/guide/qssnbar1.html FPM rules may be used in the pre-capture filter, for example, for capturing all known exploits of a known attack vector, such as all attack traffic from programs such as Slammer and MyDoom. This may be useful for further processing of such attack traffic, and for development of protecting programs against such attack traffic.

As a further example, an FPM rule may be used for capturing all packets containing a known bit pattern, such as, for example in Transmission Control Protocol (TCP) and User Datagram Protocol (UDP), as well as in Generic Routing Encapsulation (GRE) and Ethernet Layer 2 protocols.

Additional examples, as well as further information relating to the benefits and functionalities of FPM rules, may be found in 'Flexible Packet Matching Deployment Guide' published by Cisco, the contents of which are hereby incorporated by reference and which can be found at:
http://www.cisco.com/en/US/prod/collateral/iosswrel/ps6537/ps6586/ps6723/prod_white_paper0900aecd803936f6.html The term "monitoring station" as used hereinabove is intended to be used in a broad sense, including devices which are external to the post-capture filters, or may alternatively be a Shared Port Adapter (SPA) based embedded server or a blade server that is defined as a SPAN destination.

It is appreciated that, as described hereinabove, the pre-capture filter does not directly transmit packets to monitoring stations, but rather only receives packets from multiple high speed network devices connected to the network and aggregating traffic on its core side, and transmits those packets to post-capture filters. Thus, the system described hereinabove is resistant to changes of topology in the core side of the network.

Figure 2A:
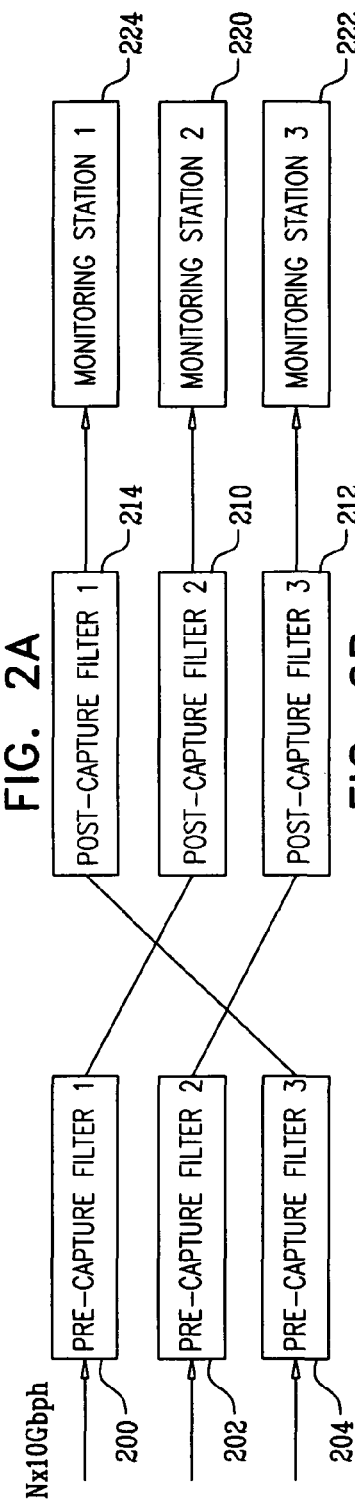
FIGS. 2A, 2B and 2C are simplified block diagram illustrations of three alternate topologies of a data monitoring system constructed and operative in accordance with another embodiment of the present invention.
Figure 2B:
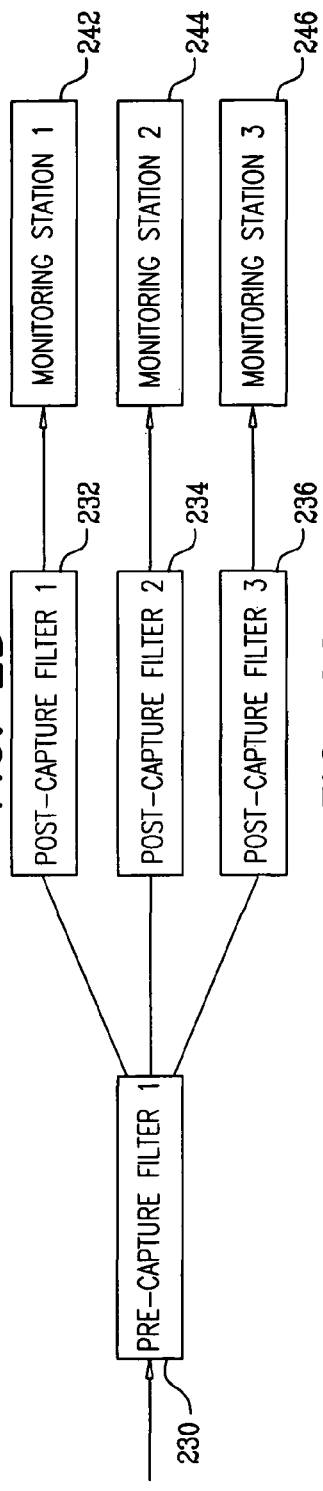
Figure 2C:
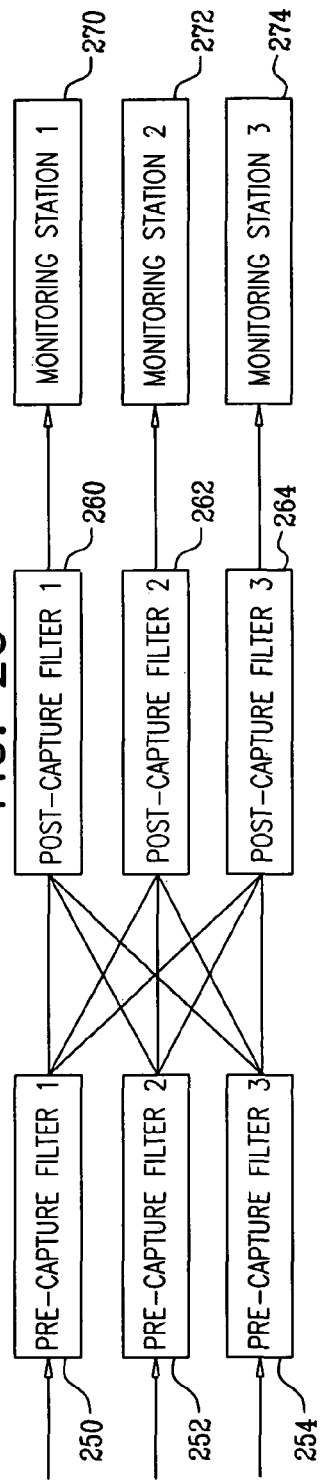

Reference is now made to FIGS. 2A, 2B and 2C, which are simplified block diagram illustrations of three alternate topologies of a data monitoring system constructed and operative in accordance with another embodiment of the present invention.

As seen in FIG. 2A, the system has an "any to any" topology, in which multiple pre-capture filters, receiving packets from multiple 1 to 10 Gb per second ports, are each paired with a single one of multiple post-capture filters, such that each pre-capture filter transmits packets to a single post-capture filter. Each post capture filter is associated with one or more monitoring stations, to which it then transmits the packets it received from the pre-capture filters.

In the illustrated embodiment, there are three pre-capture filters 200, 202 and 204. Pre-capture filter 200 transmits packets to a post capture filter 210, which then transmits them on to monitoring station 220. Pre-capture filter 202 transmits packets to a post capture filter 212, which then transmits them on to monitoring station 222. Pre-capture filter 204 transmits packets to a post capture filter 214, which then transmits them on to monitoring station 224.

It is appreciated that, as described hereinabove with reference to FIG. 1, the post-capture filters are application-type specific filters, and thus in the topology of FIG. 2A the pre-capture filters are preferably also be application-type specific, in that they each transmit to the post-capture filter associated therewith only packets of the specific application-type that that specific post capture filter can handle, and ignore or drop all other packets. Alternatively, each of the pre-capture filters may transmit all the packets that it receives to the post-capture filter associated therewith, and the post-capture filters ignore or drop the packets that are of an inappropriate application-type.

Turning to FIG. 99, it is seen that the system has an "any to many" topology, in which a single pre-capture filter, receiving packets from multiple 1 to 10 Gb per second ports, transmits packets to multiple post-capture filters, which then each transmit packets received thereby to one or more monitoring stations associated therewith. In this topology, the pre-capture filter identifies the application type of each packet, and transmits the packets to the different post-capture filters based on each packet's application type. Thus, the pre-capture filter functions as an application-aware filter, as described in further detail hereinabove with reference to FIG. 1.

In the illustrated embodiment, there is a single pre-capture filter 230. Pre-capture filter 230 transmits packets to post capture filters 232, 234 and 236, which are application-type specific post capture filters, based on the specific application-type of each packet. Post-capture filters 232, 234 and 236 transmit the packets that they receive to application type specific monitoring stations 242, 244 and 246, respectively, in a similar manner to that described hereinabove with reference to FIG. 1.

Turning to FIG. 2C, it is seen that the system has a "many to any" topology, in which multiple pre-capture filters, receiving packets from multiple 1 to 10 Gb per second ports, transmits packets to multiple post-capture filters, which then each transmit packets received thereby to one or more monitoring stations associated therewith. In this topology, the pre-capture filters are not application-type specific, and therefore identify the application type of each packet in order to transmit the packets to the different post-capture filters based on each packet's application type. Thus, the pre-capture filters function as application-aware filters, as described in further detail hereinabove with reference to FIG. 1. It is appreciated that in accordance with this system topology, the multiple pre-capture filters may receive packets of the same application types, and transmit these packets to the same group of post-capture filters, based on the specific application type of each packet.

In the illustrated embodiment, there are three pre-capture filters 250, 252 and 254. Each of the pre-capture filters 250, 252 and 254 receives packet of multiple application types and transmits packets received thereby to post capture filters 260, 262 and 264, which are application-type specific post capture filters, based on the specific application-type of each packet. Post-capture filters 260, 262 and 264 transmit the packets that they receive to application type specific monitoring stations 270, 272 and 274, respectively, in a similar manner to that described hereinabove with reference to FIG. 1.

Figure 3B:
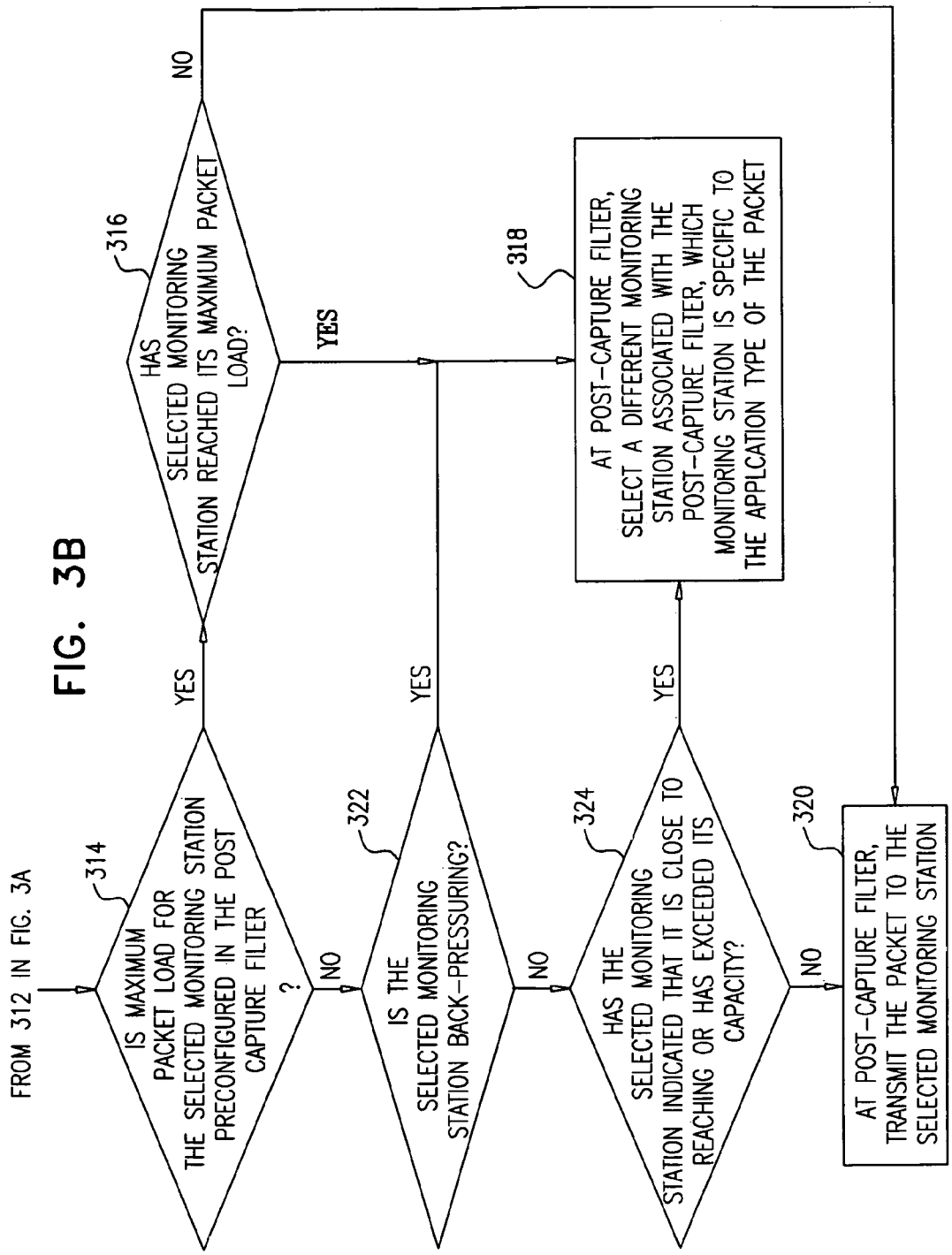

Reference is now made to FIGS. 3A and 3B, which together form a simplified flowchart that schematically illustrates a method for monitoring data in accordance with an embodiment of the present invention.

As seen in step 300 in FIG. 3A, a pre-capture filter captures packets that should be monitored, and for each captured-packet, identifies the application type of the packet, in step 302. The pre-capture filter then transmits each packet having an identified application type to a post-capture filter which is specific to the application type of the transmitted packet, in step 304.

Turning to step 306, it is seen that the application type specific post-capture filter receives a packet transmitted by the pre-capture filter, and checks whether the packet is of the suitable application type, as seen in decision step 308. If the packet is not of the suitable application type, the application type specific post-capture filter drops the packet, as seen at step 310. Otherwise, if the packet is of the suitable type, the application type specific post-capture filter selects an application type specific monitoring station associated therewith, which monitoring station monitors packets of the application type of the packet, as seen at step 312.

Turning to FIG. 3B, as seen at step 314, the post-capture filter then checks whether a maximum packet capacity for the selected monitoring station has been preconfigured therein, such as by definition of a maximum number of packets per second or bits per second which can be handled by the monitoring station. If the post-capture filter has such a maximum packet capacity preconfigured therein, it proceeds to check whether it has transmitted to the selected monitoring station its maximum packet capacity, as seen at decision step 316.

If the post-capture filter has already transmitted to the selected monitoring station its maximum packet capacity, the application type specific post-capture filter selects a different application type specific monitoring station associated therewith, which monitoring station monitors packets of the application type of the packet, as seen at step 318. The applications type specific post-capture filter then continues processing the packet at decision step 314, as described hereinabove. Otherwise, if the selected monitoring station has not reached its maximum packet capacity, the application type specific post-capture filter transmits the packet to the selected monitoring station for monitoring of the data included in the packet, at step 320.

If the post capture filter was not preconfigured to define a maximum packet capacity for the selected monitoring station, the application type specific post-capture filter checks whether the selected monitoring station is back-pressuring, as seen at decision step 322. If the selected monitoring station is not back pressuring, the application type specific post-capture filter proceeds to checking whether the selected monitoring station has indicated that it is close to reaching or has already exceeded its packet capacity, as seen at decision step 324.

If the selected monitoring station is not back pressuring and has not indicated that it is close to reaching or has exceeded its packet capacity, the application type specific post-capture filter transmits the packet to the selected monitoring station for monitoring of the data included in the packet, at step 320.

Otherwise, if the selected monitoring station is back pressuring or if the application type specific post-capture filter has received an indication that the selected monitoring station is close to reaching its packet capacity or has exceeded its packet capacity, the application type specific post-capture filter selects a different application type specific monitoring station associated therewith, which monitoring station monitors packets of the application type of the packet, as seen at step 318. The application type specific post-capture filter then continues processing the packet at decision step 314, as described hereinabove.

It will be appreciated by persons skilled in the art that the present invention is not limited to what has been particularly shown and described hereinabove. Rather the scope of the present invention includes both combinations and subcombinations of various features described hereinabove as well as modifications of such features which would occur to a person of ordinary skill in the art upon reading the foregoing description and which are not in the prior art.

The invention claimed is:

1. An apparatus comprising:
   at least one pre-capture filter,
   a plurality of post-capture filters, wherein each post-capture filter is associated with an application type and wherein the plurality of post-capture filters includes post-capture filters for at least two of: a video application type, an audio application type, and a text application type; and a plurality of monitoring stations, wherein each monitoring station is associated with an application type, wherein the at least one pre-capture filter is operative to:

receive a plurality of packets transmitted in a network, and for each received packet to:

identify an application type of the received packet, and, responsively to the identified application type, to select a post-capture filter from the plurality of post-capture filters, such that the selected post-capture filter is associated with the identified application-type, and to send the received packet to the selected post-capture filter; and wherein each of said plurality of application-type specific post capture filters is operative to:

receive from said at least one pre-capture filter packets of a specific application type and to distribute said packets of said specific application type among at least two monitoring stations associated with said specific application type.

2. An apparatus according to claim 1, and wherein at least one of said plurality of post capture filters is operative to limit the rate of packets transmitted to said at least one of the plurality of monitoring stations.

3. An apparatus according to claim 2, and wherein said at least one post capture filter is associated with a plurality of monitoring stations, and is operative, upon receipt of an indication from one of said monitoring stations associated therewith, to balance a load of packets transmitted to at least one of said monitoring stations.

4. An apparatus according to claim 3, and wherein said indication comprises back-pressure from said at least one of said monitoring stations.

5. An apparatus according to claim 3, and wherein said indication comprises an overload message transmitted by said at least one of said monitoring stations.

6. An apparatus according to claim 1, and wherein said at least one pre capture filter functions as a demultiplexer.

7. A method for monitoring data transmitted over a communications network, the method comprising:

employing a pre capture filter to receive a plurality of packets transmitted in said communications network; and for each received packet;

employing said pre capture filter to identify an application type of the received packet, employing said pre capture filter to select a post-capture filter from a plurality of post-capture filters, such that the selected post-capture filter is associated with the identified application-type and wherein the plurality of post-capture filters includes post-capture filters for at least two of: a video application type, an audio application type, and a text application type; and employing said pre capture filter to send the received packet to the selected post-capture filter; and employing said selected post capture filter to distribute the plurality of received packets among a plurality of monitoring stations that are each associated with the identified application type.

8. A method according to claim 7, and also comprising:

employing at least one of said plurality of post capture filters for limiting the rate of packets transmitted to at least one of said plurality of monitoring stations.

9. A method according to claim 8, and wherein said at least one post capture filter is associated with the plurality of monitoring stations, and, said limiting the rate comprises, upon receipt of an indication from at least one of said monitoring stations associated therewith, balancing a load of packets transmitted to said at least one of said monitoring stations.

10. A method according to claim 9, and wherein said indication comprises back-pressure from said at least one of said monitoring stations.

11. A method according to claim 9, and wherein said indication comprises an overload message transmitted by said at least one of said monitoring stations.

12. A method according to claim 7, further comprising employing said at least one pre-capture filter as a demultiplexer.

* * * * *